United States Patent
Michaloski et al.

(10) Patent No.: US 9,851,557 B2
(45) Date of Patent: Dec. 26, 2017

(54) OPTICAL SYSTEMS INCLUDING LENS ASSEMBLIES AND METHODS OF IMAGING FIELDS OF VIEW USING SUCH OPTICAL SYSTEMS

(71) Applicant: Corning Incorporated, Corning, NY (US)

(72) Inventors: Paul Francis Michaloski, Rochester, NY (US); Mark Christian Sanson, Macedon, NY (US); Clair Theodore Tienvieri, Rochester, NY (US)

(73) Assignee: Corning Incorporated, Corning, NY (US)

( * ) Notice: Subject to any disclaimer, the term of this patent is extended or adjusted under 35 U.S.C. 154(b) by 100 days.

(21) Appl. No.: 14/926,205

(22) Filed: Oct. 29, 2015

(65) Prior Publication Data

US 2016/0124218 A1    May 5, 2016

Related U.S. Application Data

(60) Provisional application No. 62/072,629, filed on Oct. 30, 2014.

(51) Int. Cl.
| | |
|---|---|
| *G02B 26/10* | (2006.01) |
| *H04N 5/232* | (2006.01) |
| *G02B 27/00* | (2006.01) |
| *G02B 27/40* | (2006.01) |
| *H04N 3/08* | (2006.01) |

(Continued)

(52) U.S. Cl.
CPC ....... *G02B 26/105* (2013.01); *G02B 13/0005* (2013.01); *G02B 21/002* (2013.01); *G02B 26/101* (2013.01); *G02B 27/0025* (2013.01); *G02B 27/0031* (2013.01); *G02B 27/40* (2013.01); *H04N 3/08* (2013.01)

(58) Field of Classification Search
CPC ............ G02B 27/0031; G02B 13/0005; G02B 21/002
See application file for complete search history.

(56) References Cited

U.S. PATENT DOCUMENTS

| | | |
|---|---|---|
| 4,245,240 A | 1/1981 | Tanaka |
| 5,548,394 A | 8/1996 | Giles et al. |
| 5,721,585 A | 2/1998 | Keast et al. |

(Continued)

OTHER PUBLICATIONS

Stelzer. The Intermediate Optical System of Laser-Scanning Confocal Microscopes; Handbook of Biological Confocal Microscopy, 3rd Ed; New York 2006.

(Continued)

*Primary Examiner* — Elmito Breval
(74) *Attorney, Agent, or Firm* — Svetlana Z. Short

(57) ABSTRACT

Optical systems including lens assemblies and methods of imaging fields of view using such optical systems are disclosed. An optical system for imaging a two dimensional field includes a first lens assembly, a first scanning mirror, a second lens assembly, and a two dimensional image sensor. The first lens assembly has a first transform function whose output is within 0.1% of $f_1*(c_1*\theta_1+(1-c_1)*\sin(\theta_1))$ for any ray of light that traverses the first lens assembly from a center of an entrance pupil of the first lens assembly at an angle $\theta_1$ relative to an optical axis of the first lens assembly. $f_1$ is a focal length of the first lens assembly, and $-0.5<c_1<2$.

21 Claims, 10 Drawing Sheets

(51) Int. Cl.
*G02B 13/00* (2006.01)
*G02B 21/00* (2006.01)

(56) References Cited

U.S. PATENT DOCUMENTS

| | | |
|---|---|---|
| 5,932,860 A | 8/1999 | Plesko |
| 7,196,801 B1 | 3/2007 | Janik et al. |
| 2003/0080190 A1 | 5/2003 | Tsikos et al. |
| 2007/0206258 A1 | 9/2007 | Malyak et al. |

OTHER PUBLICATIONS

PCT International Searching Authority; International Search Report and Written Opinion; Application No. PCT/US2015/057704; dated Jan. 11, 2016.
"Large Working Area F-Theta Lens," Yiqun et al., Proceedings of SPIE vol. 6034 (2006).
"Area Scanning Vision Inspection System by Using Mirror Control," Jeong et al., Proceedings of SPIE, vol. 4190 (2001).
"Imaging inflammation in mouse colon using a rapid stage-scanning confocal fluorescence microscope," Journal of Biomedical Optics vol. 17(1) (Jan. 2012).

OPTICAL SYSTEMS INCLUDING LENS ASSEMBLIES AND METHODS OF IMAGING FIELDS OF VIEW USING SUCH OPTICAL SYSTEMS

CROSS-REFERENCE TO RELATED APPLICATIONS

This application claims the benefit of priority under 35 U.S.C. §119 of U.S. Provisional Application Ser. No. 62/072,629 filed on Oct. 30, 2014, the content of which is relied upon and incorporated herein by reference in its entirety.

BACKGROUND

Field

The present specification generally relates to optical systems and methods of imaging fields of view, and, more particularly, to optical systems including lens assemblies and methods of imaging fields of view using such optical systems.

Technical Background

Optical imaging systems may be used to image a sample or field of view with an image sensor. When the sample or field of view is moved relative to the optical imaging system, a scanning system including a scan mirror may be used to ensure that the sample or field of view remains incident on the image sensor. However, such scanning systems may suffer from undesirable distortion of the imaged sample or field of view as the sample or field of view moves relative to the image sensor.

Accordingly, a need exists for optical systems including lens assemblies having lens designs that may mitigate distortion and methods of imaging fields of view using such optical systems.

SUMMARY

According to one embodiment, an optical system for imaging a two dimensional field includes a first lens assembly, a first scanning mirror, a second lens assembly, and a two dimensional image sensor. The first lens assembly has a first transform function whose output is within 0.1% of $f_1*(c_1*\theta_1+(1-c_1)*\sin(\theta_1))$ for any ray of light that traverses the first lens assembly from a center of an entrance pupil of the first lens assembly at an angle $\theta_1$ relative to an optical axis of the first lens assembly. $f_1$ is a focal length of the first lens assembly, and $-0.5<c_1<2$. The second lens assembly has a second transform function whose output is within 0.1% of $f_2*(c_2*\theta_2+(1-c_2)*\sin(\theta_2))$ for any ray of light that traverses the second lens assembly from a center of an entrance pupil of the second lens assembly at an angle $\theta_2$ relative to an optical axis of the second lens assembly. $f_2$ is a focal length of the second lens assembly, and $-0.5<c_2<2$. The first lens assembly, the first scanning mirror, and the second lens assembly are positioned in an optical path between the two dimensional field and the two dimensional image sensor such that light from the two dimensional field traverses the second lens assembly, is incident on the first scanning mirror, is redirected into the first lens assembly by the first scanning mirror, traverses the first lens assembly, and is incident upon the two dimensional image sensor, thereby imaging the two dimensional field with the two dimensional image sensor.

In another embodiment, a method of imaging a two dimensional field includes providing an optical system. The optical system includes a first lens assembly, a first scanning mirror, a second lens assembly, and a two dimensional image sensor. The first lens assembly has a first transform function whose output is within 0.1% of $f_1*(c_1*\theta_1+(1-c_1)*\sin(\theta_1))$ for any ray of light that traverses the first lens assembly from a center of an entrance pupil of the first lens assembly at an angle $\theta_1$ relative to an optical axis of the first lens assembly. $f_1$ is a focal length of the first lens assembly, and $-0.5<c_1<2$. The second lens assembly has a second transform function whose output is within 0.1% of $f_2*(c_2*\theta_2+(1-c_2)*\sin(\theta_2))$ for any ray of light that traverses the second lens assembly from a center of an entrance pupil of the second lens assembly at an angle $\theta_2$ relative to an optical axis of the second lens assembly. $f_2$ is a focal length of the second lens assembly, and $-0.5<c_2<2$. The first lens assembly, the first scanning mirror, and the second lens assembly are positioned in an optical path between the two dimensional field and the two dimensional image sensor such that light from the two dimensional field traverses the second lens assembly, is incident on the first scanning mirror, is redirected into the first lens assembly by the first scanning mirror, traverses the first lens assembly, and is incident upon the two dimensional image sensor. The method further includes rotating the first scanning mirror such that light from the two dimensional field traverses the second lens assembly, is incident on the first scanning mirror, is redirected into the first lens assembly by the first scanning mirror, traverses the first lens assembly, and is incident upon the two dimensional image sensor when the two dimensional field moves relative to the optical system, such that the two dimensional field remains imaged by the two dimensional image sensor.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

As used herein, a "transform function" of a lens assembly, for a ray of light that traverses the lens assembly from an entrance pupil of the lens assembly to a focal plane, maps an input angle to an output radial distance. The input angle of the transform function is an angle of the light relative to an optical axis of the lens assembly at the entrance pupil. The output radial distance of the transform function is a radial distance from the light to the optical axis at the focal plane.

Conventional optical systems, such as scanning optical systems, may include one or more lens assemblies having f-tan theta lens designs (i.e. lens assemblies that are designed for an $f*\tan(\theta)$ transform function) because lens assemblies having f-tan theta lens designs are believed to minimize overall system distortion. However, it has now been discovered that utilizing conventional lens assemblies having f-tan theta lens designs in scanning optical systems for imaging a two dimensional field or sample that moves relative to the optical system may result in unacceptably high levels of distortion. In particular, that utilizing conventional lens assemblies having f-tan theta lens designs in scanning optical systems for imaging a two dimensional field or sample that moves relative to the optical system may result in unacceptably high levels of trapezoidal image distortion. Trapezoidal image distortion is undesirable because it causes a reduced energy density of light sensed by pixels of a two dimensional image sensor, and it may be more difficult to correct by post-processing an image sensed by the two dimensional image sensor. The lens assemblies described herein, which have distortion mitigating lens designs as described below, may mitigate at least one type of system distortion as compared to lens assemblies having conventional f-tan theta lens designs.

Figure 1:
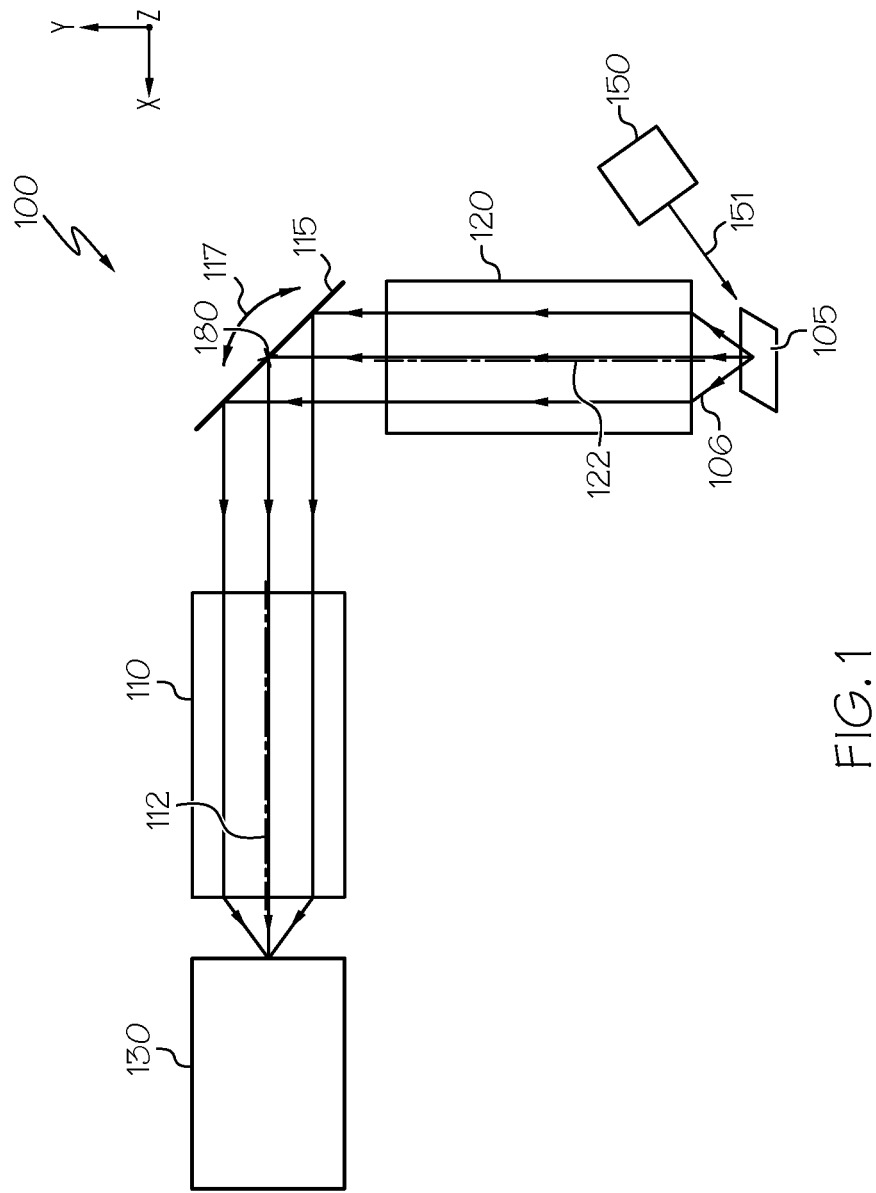
FIG. 1 schematically depicts an optical imaging system, according to one or more embodiments shown and described herein.

Reference will now be made in detail to various embodiments of optical systems including lens assemblies and methods of imaging fields of view using such optical systems, examples of which are illustrated in the accompanying drawings. Whenever possible, the same reference numerals will be used throughout the drawings to refer to the same or like parts. FIG. 1 schematically depicts an optical system for imaging a two dimensional field that includes a first lens assembly, a scanning mirror, a second lens assembly, and a two dimensional image sensor. The first lens assembly, the scanning mirror, and the second lens assembly are positioned in an optical path between the two dimensional field and the two dimensional image sensor such that light from the two dimensional field traverses the second lens assembly, is incident on the first scanning mirror, is redirected into the first lens assembly by the first scanning mirror, traverses the first lens assembly, and is incident upon the two dimensional image sensor, thereby imaging the two dimensional field with the two dimensional image sensor. The first lens assembly has a first transform function whose output is within 0.1% of $f_1*(c_1*\theta_1+(1-c_1)*\sin(\theta_1))$ for any ray of light that traverses the first lens assembly from a center of an entrance pupil of the first lens assembly at an angle $\theta_1$ relative to an optical axis of the first lens assembly, wherein $f_1$ is a focal length of the first lens assembly, and wherein $-0.5<c_1<2$. The second lens assembly has a second transform function whose output is within 0.1% of $f_2*(c_2*\theta_2+(1-c_2)*\sin(\theta_2))$ for any ray of light that traverses the second lens assembly from a center of an entrance pupil of the second lens assembly at an angle $\theta_2$ relative to an optical axis of the second lens assembly, wherein $f_2$ is a focal length of the second lens assembly, and wherein $-0.5<c_2<2$. Optical systems with lens assemblies having such transform functions may reduce various types of system distortion as explained in detail below. Optical systems including lens assemblies having distortion mitigating lens designs and methods of imaging fields of view using such optical systems are described in more detail herein with specific reference to the appended figures.

Referring now to FIG. 1, one embodiment of an optical system 100 for imaging a two dimensional field 105 is schematically depicted. The optical system 100 includes a two dimensional image sensor 130, a first lens assembly 110, a scanning mirror 115, a second lens assembly 120, and an illumination source 150. As depicted in FIG. 1, the first lens assembly 110, the scanning mirror 115, and the second lens assembly 120 are positioned in an optical path between the two dimensional field 105 and the two dimensional image sensor 130, such that light emitted or reflected from the two dimensional field 105 may be sensed by the two dimensional image sensor 130.

Still referring to FIG. 1, the first lens assembly 110 includes one or more lens elements. In some embodiments, the first lens assembly 110 also includes one or more mirrors. Each of the one or more lens elements of the first lens assembly 110 may be any type of lens element, such as a biconvex lens, a plano-convex lens, a positive meniscus lens, a negative meniscus lens, a plano-concave lens, a biconcave lens, or the like. Each of the one or more lens elements of the first lens assembly 110 may be fabricated from glass, plastic, or any other suitable material. In some embodiments, the first lens assembly 110 is an infinite conjugate lens assembly. In some embodiments, the first lens assembly 110 is an infinite conjugate tube lens assembly as used in microscope systems. The first lens assembly 110 has an optical axis 112, about which there is rotational symmetry for light traversing the first lens assembly 110.

Still referring to FIG. 1, the first lens assembly 110 has a first transform function whose output is within 0.1% of $f_1*(c_1*\theta_1+(1-c_1)*\sin(\theta_1))$ for any ray of light that traverses the first lens assembly 110 from a center of an entrance pupil (depicted at position 180) of the first lens assembly 110 at an angle $\theta_1$ relative to an optical axis 112 of the first lens assembly 110. $f_1$ is a focal length of the first lens assembly 110. The transform constant $c_1$ satisfies the relation $-0.5<c_1<2$ in some embodiments, though in other embodiments, the transform constant $c_1$ may be different. A lens assembly having such a transform function mitigates one or more types of system distortion, as described further below.

In some embodiments, the output of the first transform function is $f_1*(c_1*\theta_1+(1-c_1)*\sin(\theta_1))$ for any ray of light that traverses the first lens assembly 110 from a center of an entrance pupil (depicted at position 180) of the first lens assembly 110 at an angle $\theta_1$ relative to an optical axis 112 of the first lens assembly 110. While the output of the first transform function is described herein as within 0.1% of $f_1*(c_1*\theta_1+(1-c_1)*\sin(\theta_1))$, embodiments are not limited thereto. For example, in other embodiments, the output of the first transform function is within 0.05%, within 0.2%, within 0.5%, within 1%, or within 2% of $f_1*(c_1*\theta_1+(1-c_1)*\sin(\theta_1))$ for any ray of light that traverses the first lens assembly 110 from a center of an entrance pupil (depicted at position 180) of the first lens assembly 110 at an angle $\theta_1$ relative to an optical axis 112 of the first lens assembly 110.

Some particular values of $c_1$ result in the mitigation of particular types of system distortion. For example, in embodiments when $c_1=0$, the output of the first transform function is within 0.1% of $f_1*(0*\theta_1+(1-0)*\sin(\theta_1))=f_1*\sin(\theta_1)$ for any ray of light that traverses the first lens assembly 110 from a center of an entrance pupil (depicted at position 180) of the first lens assembly 110 at an angle $\theta_1$ relative to an optical axis 112 of the first lens assembly 110. Such embodiments may minimize or otherwise mitigate $\Delta y$ distortion, which may be difficult to correct.

In embodiments when $c_1=1$, the output of the first transform function is within 0.1% of $f_1*(1*\theta_1+(1-1)*\sin(\theta_1))=f_1*\theta_1$ for any ray of light that traverses the first lens assembly 110 from a center of an entrance pupil (depicted at position 180) of the first lens assembly 110 at an angle $\theta_1$ relative to an optical axis 112 of the first lens assembly 110. Such embodiments may minimize or otherwise mitigate trapezoidal distortion, and may minimize distortion between scan positions.

In embodiments when $c_1=1.5$, the output of the first transform function is within 0.1% of $f_1*(1.5*\theta_1+(1-1.5)*\sin(\theta_1))=f_1*(3*\theta_1-\sin(\theta_1))/2$ for any ray of light that traverses the first lens assembly 110 from a center of an entrance pupil (depicted at position 180) of the first lens assembly 110 at an angle $\theta_1$ relative to an optical axis 112 of the first lens assembly 110. Such embodiments may minimize or otherwise mitigate distortion at a single scan position.

Still referring to FIG. 1, the second lens assembly 120 includes one or more lens elements. In some embodiments, the second lens assembly 120 also includes one or more mirrors. As with the first lens assembly 110, each of the one or more lens elements of the second lens assembly 120 may be any type of lens element, such as a biconvex lens, a plano-convex lens, a positive meniscus lens, a negative meniscus lens, a plano-concave lens, a biconcave lens, or the like. Each of the one or more lens elements of the second lens assembly 120 may be fabricated from glass, plastic, or any other suitable material. In some embodiments, the second lens assembly 120 is an infinite conjugate lens assembly. In some embodiments, the second lens assembly 120 is an objective lens assembly. In some embodiments, the second lens assembly 120 may include the same components as the first lens assembly 110 and may have the same optical properties. An optical system 100 in which the first lens assembly 110 and the second lens assembly 120 have the same components, the optical system 100 may be more economically and easily designed than a system in which both the first lens assembly 110 and the second lens assembly 120 contain different components and must be selected or designed such that the overall system has specified properties. However, in other embodiments, the first lens assembly 110 and the second lens assembly 120 may include one or more different components.

Still referring to FIG. 1, the second lens assembly 120 has a second transform function whose output is within 0.1% of $f_2*(c_2*\theta_2+(1-c_2)*\sin(\theta_2))$ for any ray of light that traverses the second lens assembly 120 from a center of an entrance pupil of the second lens assembly 120 at an angle $\theta_2$ relative to an optical axis 122 of the second lens assembly 120. $f_2$ is a focal length of the second lens assembly 120. The transform constant $c_2$ satisfies the relation $-0.5<c_2<2$ in some embodiments, though in other embodiments, the transform constant $c_2$ may be different. A lens assembly having such a transform function mitigates one or more types of system distortion, as described further below. In some embodiments, the output of the second transform function is $f_2*(c_2*\theta_2+(1-c_2)*\sin(\theta_2))$ for any ray of light that traverses the second lens assembly 120 from a center of an entrance pupil of the second lens assembly 120 at an angle $\theta_2$ relative to an optical axis 122 of the second lens assembly 120. While the output of the second transform function is described herein as within 0.1% of $f_2*(c_2*\theta_2+(1-c_2)*\sin(\theta_2))$, embodiments are not limited thereto. For example, in other embodiments, the output of the second transform function is within 0.05%, within 0.2%, within 0.5%, within 1%, or within 2% of $f_2*(c_2*\theta_2+(1-c_2)*\sin(\theta_2))$ for any ray of light that traverses the second lens assembly 120 from a center of an entrance pupil of the second lens assembly 120 at an angle $\theta_2$ relative to an optical axis 122 of the second lens assembly 120.

Some particular values of $c_2$ result in the mitigation of particular types of system distortion. For example, in embodiments when $c_2=0$, the output of the second transform function is within 0.1% of $f_2*(0*\theta_2+(1-0)*\sin(\theta_2))=f_2*\sin(\theta_2))$ for any ray of light that traverses the second lens assembly 120 from a center of an entrance pupil of the second lens assembly 120 at an angle $\theta_2$ relative to an optical axis 122 of the second lens assembly 120. Such embodiments may minimize or otherwise mitigate $\Delta y$ distortion, which may be difficult to correct.

In embodiments when $c_2=1$, the output of the second transform function is within 0.1% of $f_2*(1*\theta_2+(1-1)*\sin(\theta_2))=f_2*\theta_2$ for any ray of light that traverses the second lens assembly 120 from a center of an entrance pupil of the second lens assembly 120 at an angle $\theta_2$ relative to an optical axis 122 of the second lens assembly 120. Such embodiments may minimize or otherwise mitigate trapezoidal distortion, and may minimize distortion between scan positions.

In embodiments when $c_2=1.5$, the output of the second transform function is within 0.1% of $f_2*(1.5*\theta_2+(1-1.5)*\sin(\theta_2))=f_2*(3*\theta_2-\sin(\theta_2))/2$ for any ray of light that traverses the second lens assembly 120 from a center of an entrance pupil of the second lens assembly 120 at an angle $\theta_2$ relative to an optical axis 122 of the second lens assembly 120. Such embodiments may minimize or otherwise mitigate distortion at a single scan position.

In some embodiments, the transform constant $c_1$ of the first transform function of the first lens assembly 110 is the same as the transform constant $c_2$ of the second transform function of the second lens assembly 120. When the transform constant $c_1$ of the first transform function of the first lens assembly 110 is the same as the transform constant $c_2$ of the second transform function of the second lens assembly 120, there may be little or no distortion when the scanned field is centered on the optical axis of the lens assemblies. When the transform constant $c_1$ of the first transform function of the first lens assembly 110 is not the same as the transform constant $c_2$ of the second transform function of the second lens assembly 120, there is typically radial distortion (the amount of which depends on the difference of the transform constants) when the scanned field is centered on the optical axis of the lens assemblies.

Still referring to FIG. 1, the second lens assembly 120 has an optical axis 122, about which there is rotational symmetry for light traversing the second lens assembly 120. In some embodiments, such as the embodiment depicted in FIG. 1, the optical axis 122 of the second lens assembly 120 is perpendicular to the optical axis 112 of the first lens assembly 110. In other embodiments, the optical axis 122 of the second lens assembly 120 is substantially perpendicular to the optical axis 112 of the first lens assembly 110. However, in other embodiments, the optical axis 122 of the second lens assembly 120 may not be perpendicular to or substantially perpendicular to the optical axis 112 of the first lens assembly 110.

Still referring to FIG. 1, the scanning mirror 115 includes a mirror surface that reflects incident light. In some embodiments, the scanning mirror 115 includes a scanning mirror motor mechanically coupled to the mirror surface that is operable to rotate the mirror surface about at least one axis of rotation. For example, in the embodiment depicted in FIG. 1, the scanning mirror 115 rotates about the z axis. In some embodiments, the scanning mirror 115 may rotate about more than one axis, such as when the scanning mirror 115 rotates about the z axis and one or more of the x axis and the y axis. For example, in some embodiments, the scanning mirror 115 is rotatable about the z axis and about the y axis, which is perpendicular to the z axis. In some embodiments, such as the embodiment depicted in FIG. 1, the scanning mirror 115 is positioned such that, when the scanning mirror 115 is in a neutral position, the mirror surface of the scanning mirror 115 is oriented at an angle of about 45° relative to the optical axis 112 of the first lens assembly 110 and at an angle of about 45° relative to the optical axis 122 of the second lens assembly 120. However, it should be understood that in other embodiments, the angle at which the mirror surface of the scanning mirror 115 is oriented relative to the optical axis 112 of the first lens assembly 110 or the optical axis 122 of the second lens assembly 120 in the neutral position may not be 45°, such as when the angle at which the mirror surface of the scanning mirror 115 is oriented relative to the optical axis 112 of the first lens assembly 110 in the neutral position is different than the angle at which the mirror surface of the scanning mirror 115 is oriented relative to the optical axis 122 of the second lens assembly 120 in the neutral position.

In some embodiments, such as the embodiment depicted in FIG. 1, the scanning mirror 115 is positioned at an entrance pupil of the first lens assembly 110 (depicted at position 180) and at the exit pupil (depicted at position 180) of the second lens assembly 120. However, in other embodiments, the scanning mirror 115 may not be positioned at the entrance pupil of the first lens assembly 110 and at the exit pupil of the second lens assembly 120, such as in embodiments in which the scanning mirror 115 is positioned at only one of the entrance pupil of the first lens assembly 110 and the exit pupil of the second lens assembly 120, or in embodiments in which the scanning mirror 115 is slightly offset from at least one of the entrance pupil of the first lens assembly 110 and the exit pupil of the second lens assembly 120.

Still referring to FIG. 1, the two dimensional image sensor 130 may be any device having an array of sensing devices (e.g., pixels) capable of detecting radiation in an ultraviolet wavelength band, a visible light wavelength band, or an infrared wavelength band. The two dimensional image sensor 130 may have any resolution. In some embodiments, each pixel of the two dimensional image sensor 130 senses light from an array of scanned objects in the two dimensional field 105, such as an array of biological specimens.

Still referring to FIG. 1, the illumination source 150 may be any device capable of emitting electromagnetic radiation 151 of any wavelength that is incident on the two dimensional field 105 in order to illuminate the two dimensional field 105. In some embodiments, the illumination source 150 may emit fluorescent light to illuminate the two dimensional field 105. While the embodiment depicted in FIG. 1 includes the illumination source 150, it should be understood that other embodiments do not include the illumination source 150, such as embodiments in which the two dimensional field 105 is sufficiently illuminated by ambient light to facilitate the imaging of the two dimensional field 105 by the two dimensional image sensor 130.

Still referring to FIG. 1, in operation, a method of imaging the two dimensional field 105 with the optical system 100 may include providing and/or assembling the optical system 100 such that light 106 from the two dimensional field 105 traverses the second lens assembly 120, is incident on the scanning mirror 115, is redirected into the first lens assembly 110 by the scanning mirror 115, traverses the first lens assembly 110, and is incident upon the two dimensional image sensor 130, thereby imaging the two dimensional field 105 with the two dimensional image sensor 130. The two dimensional field 105 may be moved relative to the optical system 100 (such as when the two dimensional field 105 represents a sample to be imaged by the optical system 100, and the sample is moved in the x direction). The scanning mirror 115 may be rotated about the z axis such that the light 106 from the two dimensional field 105 traverses the second lens assembly 120, is incident on the scanning mirror 115, is redirected by the scanning mirror 115 into the first lens assembly 110, traverses the first lens assembly 110, and is incident upon the two dimensional image sensor 130. Thus, the two dimensional field 105 remains imaged by the two dimensional image sensor 130 despite the two dimensional field 105 to be imaged having moved relative to the optical system 100. In some embodiments, electromagnetic radiation may be output from the illumination source 150 onto the two dimensional field 105 to illuminate the two dimensional field 105.

Still referring to FIG. 1 and the operation of the optical system 100, as the two dimensional field 105 moves relative to the optical system 100 and the scanning mirror 115 rotates to maintain an image of the two dimensional field 105 on the two dimensional image sensor 130, the optical system 100 experiences lower system distortion than a conventional optical system that includes lens assemblies having f-tan theta lens designs.

Figure 2:
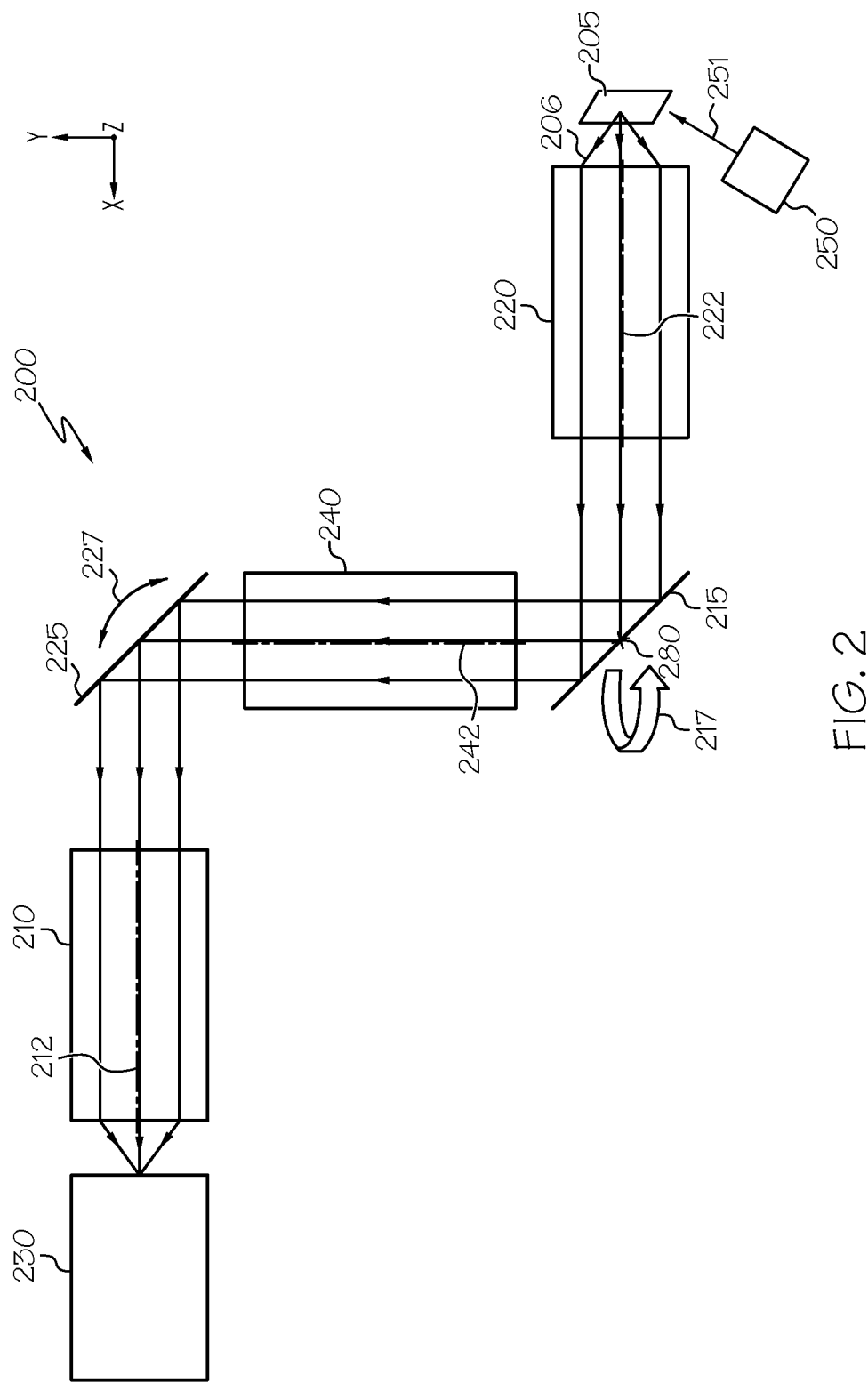
FIG. 2 schematically depicts an optical imaging system, according to one or more embodiments shown and described herein.

Referring now to FIG. 2, one embodiment of an optical system 200 for imaging a two dimensional field 205 is schematically depicted. The optical system 200 includes a two dimensional image sensor 230, a first lens assembly 210, a first scanning mirror 225, an image relay 240, a second scanning mirror 215, a second lens assembly 220, and an illumination source 250. As depicted in FIG. 2, the first lens assembly 210, the first scanning mirror 225, the image relay 240, the second scanning mirror 215, and the second lens assembly 220 are positioned in an optical path between the two dimensional field 205 and the two dimensional image sensor 230, such that light emitted or reflected from the two dimensional field 205 may be sensed by the two dimensional image sensor 230.

Still referring to FIG. 2, the first lens assembly 210 includes one or more lens elements. In some embodiments, the first lens assembly 210 also includes one or more mirrors. Each of the one or more lens elements of the first lens assembly 210 may be any type of lens element, such as a biconvex lens, a plano-convex lens, a positive meniscus lens, a negative meniscus lens, a plano-concave lens, a biconcave lens, or the like. Each of the one or more lens elements of the first lens assembly 210 may be fabricated from glass, plastic, or any other suitable material. In some embodiments, the first lens assembly 210 is an infinite conjugate lens assembly. In some embodiments, the first lens assembly 210 is an infinite conjugate tube lens assembly as used in microscope systems. The first lens assembly 210 has an optical axis 212, about which there is rotational symmetry for light traversing the first lens assembly 210.

Still referring to FIG. 2, the first lens assembly 210 has a first transform function whose output is within 0.1% of $f_1*(c_1*\theta_1+(1-c_1)*\sin(\theta_1))$ for any ray of light that traverses the first lens assembly 210 from a center of an entrance pupil of the first lens assembly 210 at an angle $\theta_1$ relative to an optical axis 212 of the first lens assembly 210. $f_1$ is a focal length of the first lens assembly 210. The transform constant $c_1$ satisfies the relation $-0.5<c_1<2$ in some embodiments, though in other embodiments, the transform constant $c_1$ may be different. A lens assembly having such a transform function mitigates one or more types of system distortion, as described further below. In some embodiments, the output of the first transform function is $f_1*(c_1*\theta_1+(1-c_1)*\sin(\theta_1))$ for any ray of light that traverses the first lens assembly 210 from a center of an entrance pupil of the first lens assembly 210 at an angle $\theta_1$ relative to an optical axis 212 of the first lens assembly 210. While the output of the first transform function is described herein as within 0.1% of $f_1*(c_1*\theta_1+(1-c_1)*\sin(\theta_1))$, embodiments are not limited thereto. For example, in other embodiments, the output of the first transform function is within 0.05%, within 0.2%, within 0.5%, within 1%, or within 2% of $f_1*(c_1*\theta_1+(1-c_1)*\sin(\theta_1))$ for any ray of light that traverses the first lens assembly 210 from a center of an entrance pupil of the first lens assembly 210 at an angle $\theta_1$ relative to an optical axis 212 of the first lens assembly 210.

Some particular values of $c_1$ result in the mitigation of particular types of system distortion. For example, in embodiments when $c_1=0$, the output of the first transform function is within 0.1% of $f_1*(0*\theta_1+(1-0)*\sin(\theta_1))=f_1*\sin(\theta_1)$ for any ray of light that traverses the first lens assembly 210 from a center of an entrance pupil of the first lens assembly 210 at an angle $\theta_1$ relative to an optical axis 212 of the first lens assembly 210. Such embodiments may minimize or otherwise mitigate $\Delta y$ distortion, which may be difficult to correct.

In embodiments when $c_1=1$, the output of the first transform function is within 0.1% of $f_1*(1*\theta_1+(1-1)*\sin(\theta_1))=f_1*\theta_1$ for any ray of light that traverses the first lens assembly 210 from a center of an entrance pupil of the first lens assembly 210 at an angle $\theta_1$ relative to an optical axis 212 of the first lens assembly 210. Such embodiments may minimize or otherwise mitigate trapezoidal distortion, and may minimize distortion between scan positions.

In embodiments when $c_1=1.5$, the output of the first transform function is within 0.1% of $f_1*(1.5*\theta_1+(1-1.5)*\sin(\theta_1))=f_1*(3*\theta_1-\sin(\theta_1))/2$ for any ray of light that traverses the first lens assembly 210 from a center of an entrance pupil of the first lens assembly 210 at an angle $\theta_1$ relative to an optical axis 212 of the first lens assembly 210. Such embodiments may minimize or otherwise mitigate distortion at a single scan position.

Still referring to FIG. 2, the image relay 240 includes one or more lens elements. In some embodiments, the image relay 240 also includes one or more mirrors. Each of the one or more lens elements of the image relay 240 may be any type of lens element, such as a biconvex lens, a plano-convex lens, a positive meniscus lens, a negative meniscus lens, a plano-concave lens, a biconcave lens, or the like. Each of the one or more lens elements of the image relay 240 maybe fabricated from glass, plastic, or any other suitable material. The image relay 240 is in the optical path between the first scanning mirror 225 and the second scanning mirror 215 that optically couple the first scanning mirror 225 and the second scanning mirror 215, and may allow the first scanning mirror 225 and the second scanning mirror 215 to be farther apart than in a system lacking the image relay 240, or may invert the image between the first scanning mirror 225 and the second scanning mirror 215. The image relay 240 has an optical axis 242, about which there is rotational symmetry for light traversing the image relay 240. In some embodiments, such as the embodiment depicted in FIG. 2, the optical axis 242 of the image relay 240 is perpendicular to the optical axis 212 of the first lens assembly 210. In some embodiments, the optical axis 242 of the image relay 240 is substantially perpendicular to the optical axis 212 of the first lens assembly 210. However, in other embodiments, the optical axis 242 of the image relay 240 may not be perpendicular to or substantially perpendicular to the optical axis 212 of the first lens assembly 210. While the embodiment depicted in FIG. 2 includes the image relay 240, it should be understood that other embodiments do not include the image relay 240, such as embodiments in which the first scanning mirror 225 and the second scanning mirror 215 may be positioned closer together, or embodiments in which there is no need to invert the image between the first scanning mirror 225 and the second scanning mirror 215.

Still referring to FIG. 2, the second lens assembly 220 includes one or more lens elements. In some embodiments, the second lens assembly 220 also includes one or more mirrors. As with the first lens assembly 210, each of the one or more lens elements of the second lens assembly 220 may be any type of lens element, such as a biconvex lens, a plano-convex lens, a positive meniscus lens, a negative meniscus lens, a plano-concave lens, a biconcave lens, or the like. Each of the one or more lens elements of the second lens assembly 220 may be fabricated from glass, plastic, or any other suitable material. In some embodiments, the second lens assembly 220 is an infinite conjugate lens assembly. In some embodiments, the second lens assembly 220 is an objective lens assembly. In some embodiments, the second lens assembly 220 may include the same components as the first lens assembly 210 and may have the same optical properties. An optical system 200 in which the first lens assembly 210 and the second lens assembly 220 have the same components, the optical system 200 may be more economically and easily designed than a system in which both the first lens assembly 210 and the second lens assembly 220 contain different components and must be selected or designed such that the overall system has specified properties. However, in other embodiments, the first lens assembly 210 and the second lens assembly 220 may include one or more different components.

Still referring to FIG. 2, the second lens assembly 220 has a second transform function whose output is within 0.1% of $f_2*(c_2*\theta_2+(1-c_2)*\sin(\theta_2))$ for any ray of light that traverses the second lens assembly 220 from a center of an entrance pupil of the second lens assembly 220 at an angle $\theta_2$ relative to an optical axis 222 of the second lens assembly 220. $f_2$ is a focal length of the second lens assembly 220. The transform constant $c_2$ satisfies the relation $-0.5 < c_2 < 2$ in some embodiments, though in other embodiments, the transform constant $c_2$ may be different. A lens assembly having such a transform function mitigates one or more types of system distortion, as described further below. In some embodiments, the output of the second transform function is $f_2*(c_2*\theta_2+(1-c_2)*\sin(\theta_2))$ for any ray of light that traverses the second lens assembly 220 from a center of an entrance pupil of the second lens assembly 220 at an angle $\theta_2$ relative to an optical axis 222 of the second lens assembly 220. While the output of the second transform function is described herein as within 0.1% of $f_2*(c_2*\theta_2+(1-c_2)*\sin(\theta_2))$, embodiments are not limited thereto. For example, in other embodiments, the output of the second transform function is within 0.05%, within 0.2%, within 0.5%, within 1%, or within 2% of $f_2*(c_2*\theta_2+(1-c_2)*\sin(\theta_2))$ for any ray of light that traverses the second lens assembly 220 from a center of an entrance pupil of the second lens assembly 220 at an angle $\theta_2$ relative to an optical axis 222 of the second lens assembly 220.

Some particular values of $c_2$ result in the mitigation of particular types of system distortion. For example, in embodiments when $c_2=0$, the output of the second transform function is within 0.1% of $f_2*(0*\theta_2+(1-0)*\sin(\theta_2))=f_2*\sin(\theta_2)$ for any ray of light that traverses the second lens assembly 220 from a center of an entrance pupil of the second lens assembly 220 at an angle $\theta_2$ relative to an optical axis 222 of the second lens assembly 220. Such embodiments may minimize or otherwise mitigate $\Delta y$ distortion, which may be difficult to correct.

In embodiments when $c_2=1$, the output of the second transform function is within 0.1% of $f_2*(1*\theta_2+(1-1)*\sin(\theta_2))=f_2*\theta_2$ for any ray of light that traverses the second lens assembly 220 from a center of an entrance pupil of the second lens assembly 220 at an angle $\theta_2$ relative to an optical axis 222 of the second lens assembly 220. Such embodiments may minimize or otherwise mitigate trapezoidal distortion, and may minimize distortion between scan positions.

In embodiments when $c_2=1.5$, the output of the second transform function is within 0.1% of $f_2*(1.5*\theta_2+(1-1.5)*\sin(\theta_2))=f_2*(3*\theta_2-\sin(\theta_2))/2$ for any ray of light that traverses the second lens assembly 220 from a center of an entrance pupil of the second lens assembly 220 at an angle $\theta_2$ relative to an optical axis 222 of the second lens assembly 220. Such embodiments may minimize or otherwise mitigate distortion at a single scan position.

In some embodiments, the transform constant $c_1$ of the first transform function of the first lens assembly 210 is the same as the transform constant $c_2$ of the second transform function of the second lens assembly 220. When the transform constant $c_1$ of the first transform function of the first lens assembly 210 is the same as the transform constant $c_2$ of the second transform function of the second lens assembly 220, there may be little or no distortion when the scanned field is centered on the optical axis of the lens assemblies. When the transform constant $c_1$ of the first transform function of the first lens assembly 210 is not the same as the transform constant $c_2$ of the second transform function of the second lens assembly 220, there is typically radial distortion (the amount of which depends on the difference of the transform constants) when the scanned field is centered on the optical axis of the lens assemblies. In some embodiments, the image relay 240 may distort the final image. In some embodiments, the image relay 240 may have 1:1 magnification and may have a symmetric design around a relay lens aperture, which may result in no distortion added to the final image by the image relay 240.

The second lens assembly 220 has an optical axis 222, about which there is rotational symmetry for light traversing the second lens assembly 220. In some embodiments, such as the embodiment depicted in FIG. 2, the optical axis 222 of the second lens assembly 220 is parallel to the optical axis 212 of the first lens assembly 210. In other embodiments, the optical axis 222 of the second lens assembly 220 is substantially parallel to the optical axis 212 of the first lens assembly 210. However, in other embodiments, the optical axis 222 of the second lens assembly 220 may not be parallel to or substantially parallel to the optical axis 212 of the first lens assembly 210. Similarly, while the optical axis 222 of the second lens assembly 220 is perpendicular to the optical axis 242 of the image relay 240 in the embodiment depicted in FIG. 2, in other embodiments the optical axis 222 of the second lens assembly 220 may be substantially perpendicular to the optical axis 242 of the image relay 240. In other embodiments, the optical axis 222 of the second lens assembly may not be perpendicular to or substantially perpendicular to the optical axis 242 of the image relay 240.

Still referring to FIG. 2, the first scanning mirror 225 includes a mirror surface that reflects incident light. In some embodiments, the first scanning mirror 225 includes a scanning mirror motor mechanically coupled to the mirror surface that is operable to rotate the mirror surface about at least one axis of rotation. For example, in the embodiment depicted in FIG. 2, the first scanning mirror 225 rotates about the z axis. In some embodiments, the first scanning mirror 225 may rotate about more than one axis, such as when the first scanning mirror 225 rotates about the z axis and one or more of the x axis and the y axis. For example, in some embodiments, the first scanning mirror 225 is rotatable about the z axis and about the y axis, which is perpendicular to the z axis. In some embodiments, such as the embodiment depicted in FIG. 2, the first scanning mirror 225 is positioned such that, when the first scanning mirror 225 is in a neutral position, the mirror surface of the first scanning mirror 225 is oriented at an angle of about 45° relative to the optical axis 212 of the first lens assembly 210 and at an angle of about 45° relative to the optical axis 242 of the image relay 240. However, it should be understood that in other embodiments, the angle at which the mirror surface of the first scanning mirror 225 is oriented relative to the optical axis 212 of the first lens assembly 210 or the optical axis 242 of the image relay 240 in the neutral position may not be 45°, such as when the angle at which the mirror surface of the first scanning mirror 225 is oriented relative to the optical axis 212 of the first lens assembly 210 in the neutral position is different than the angle at which the mirror surface of the first scanning mirror 225 is oriented relative to the optical axis 242 of the image relay 240.

Still referring to FIG. 2, the second scanning mirror 215 includes a mirror surface that reflects incident light. In some embodiments, the second scanning mirror 215 includes a scanning mirror motor mechanically coupled to the mirror surface that is operable to rotate the mirror surface about at least one axis of rotation. For example, in the embodiment depicted in FIG. 2, the second scanning mirror 215 rotates about the y axis. In some embodiments, the second scanning mirror 215 may rotate about more than one axis, such as when the second scanning mirror 215 rotates about the y axis and one or more of the x axis and the z axis. For example, in some embodiments, the second scanning mirror 215 is rotatable about the y axis and about the x axis, which is perpendicular to the y axis. In some embodiments, such as the embodiment depicted in FIG. 2, the second scanning mirror 215 is positioned such that, when the second scanning mirror 215 is in a neutral position, the mirror surface of the second scanning mirror 215 is oriented at an angle of about 45° relative to the optical axis 222 of the second lens assembly 220 and at an angle of about 45° relative to the optical axis 242 of the image relay 240. However, it should be understood that in other embodiments, the angle at which the mirror surface of the second scanning mirror 215 is oriented relative to the optical axis 222 of the second lens assembly 220 or the optical axis 242 of the image relay 240 in the neutral position may not be 45°, such as when the angle at which the mirror surface of the second scanning mirror 215 is oriented relative to the optical axis 222 of the second lens assembly 220 in the neutral position is different than the angle at which the mirror surface of the second scanning mirror 215 is oriented relative to the optical axis 242 of the image relay 240.

Still referring to FIG. 2, the two dimensional image sensor 230 may be any device having an array of sensing devices (e.g., pixels) capable of detecting radiation in an ultraviolet wavelength band, a visible light wavelength band, or an infrared wavelength band. The two dimensional image sensor 230 may have any resolution.

Still referring to FIG. 2, the illumination source 250 may be any device capable of emitting electromagnetic radiation 251 of any wavelength that is incident on the two dimensional field 205 in order to illuminate the two dimensional field 205. In some embodiments, the illumination source 250 may emit fluorescent light to illuminate the two dimensional field 205. While the embodiment depicted in FIG. 2 includes the illumination source 250, it should be understood that other embodiments do not include the illumination source 250, such as embodiments in which the two dimensional field 205 is sufficiently illuminated by ambient light to facilitate the imaging of the two dimensional field 205 by the two dimensional image sensor 230.

Still referring to FIG. 2, in operation, a method of imaging the two dimensional field 205 with the optical system 200 may include providing and/or assembling the optical system 200 such that light 206 from the two dimensional field 205 traverses the second lens assembly 220, is incident on the second scanning mirror 215, is redirected into the image relay 240 by the second scanning mirror 215, traverses the image relay 240, is incident on the first scanning mirror 225, is redirected into the first lens assembly 210 by the first scanning mirror 225, traverses the first lens assembly 210, and is incident upon the two dimensional image sensor 230, thereby imaging the two dimensional field 205 with the two dimensional image sensor 230. The two dimensional field 205 may be moved relative to the optical system 200 (such as when the two dimensional field 205 represents a sample to be imaged by the optical system 200, and the sample is moved in the x direction). The first scanning mirror 225 may be rotated about the z axis such that the light 206 from the two dimensional field 205 traverses the second lens assembly 220, is incident on the second scanning mirror 215, is redirected into the image relay 240 by the second scanning mirror 215, traverses the image relay 240, is incident on the first scanning mirror 225, is redirected into the first lens assembly 210 by the first scanning mirror 225, traverses the first lens assembly 210, and is incident upon the two dimensional image sensor 230, thereby imaging the two dimensional field 205 with the two dimensional image sensor 230. Thus, the two dimensional field 205 remains imaged by the two dimensional image sensor 230 despite the two dimensional field 205 to be imaged having moved relative to the optical system 200. In some embodiments, electromagnetic radiation may be output from the illumination source 250 onto the two dimensional field 205 to illuminate the two dimensional field 205.

Still referring to FIG. 2 and the operation of the optical system 200, as the two dimensional field 205 moves relative to the optical system 200 and one or more of the first scanning mirror 225 and the second scanning mirror 215 rotates to maintain an image of the two dimensional field 205 on the two dimensional image sensor 230, the optical system 200 experiences lower system distortion than a conventional optical system that includes lens assemblies having f-tan theta lens designs.

Explanation of the Distortion Mitigating lens Assemblies Described Herein

An infinity corrected symmetrical image lens has a transform function that describes the radial distance from the optical axis at the image for a ray that passes through the center of the entrance pupil. The radial distance is scaled by the focal length. The function can be considered a transform, since it converts an angle in one space to a distance in another. In optical systems that have a scanning mirror at the entrance pupil, the following formulation can be used to calculate the induced distortion from the scanning of the field: $r_i = f^* func(\theta)$, where f is focal length, func( ) is the transform function and $\theta$ is the angle of the ray to the optical axis in the entrance pupil.

The distortion can be qualified at the focal plane whether the focal plane is the final image, or the starting object, where the system magnification is used to scale from one to the other. The calculation of the distortion is described in detail below.

In the lens design process, the lens can be optimized to an intended transform function func($\theta$) by creating operands that target ray intercepts based on the intended function of a number of rays that pass through the center of the aperture stop. The function should have a slope at or near one and be scaled by the focal length. Due to rotational symmetry of the objective, it should also be an odd function. An odd function is one where func($\theta$)=$-1^*$func($-\theta$). The vast majority of objectives are designed as $f^*\tan(\theta)$ systems.

As a non-limiting example, the following calculates the distortion for transform functions of $\theta$ for an objective corrected for an object at infinity (infinite corrected objective) with a 20 mm focal length and a 1:4 aspect field of 2×8 mm. The 2 mm width is in X, and the scan direction is also in X. The field is scanned a distance of 2 mm which will move the image to an adjacent field to the field centered on the optical axis. The calculation is done with an 11×11 array of rays that pass through the center of the pupil and when the field is centered on the optical axis (axial field) and a mirror tilt of $\alpha=0$, then these rays will intercept the focal plane in array of points ($x_i$, $y_i$) that are equally spaced in X and Y. This is the case for a finite imaging system in which two infinitely corrected lenses have the same transform function. The set of ($\Delta x$, $\Delta y$) for the 11×11 array are all zero at $\alpha=0$ and it can be said to be no distortion. As the mirror tilts an angle $\alpha$, there is induced distortion from the intended motion of the points by the scanning mirror. The signature of the distortion will be different for different transform functions.

The two transform functions examined are the common f tan theta and a transform function f theta+sine theta that varies continuously with the transform function coefficient c, as shown in Table 1 below.

TABLE 1

| Label | Function |
|---|---|
| f tan theta | f * tan(θ) |
| f theta + sine theta | f * (c * θ + (1 − c) * sin(θ)) |

Figure 3A:
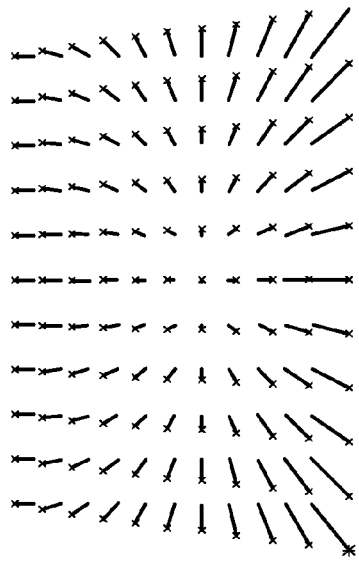
FIGS. 3A-3D schematically depict distortion vector maps for various transform functions, according to one or more embodiments shown and described herein.
Figure 3B:
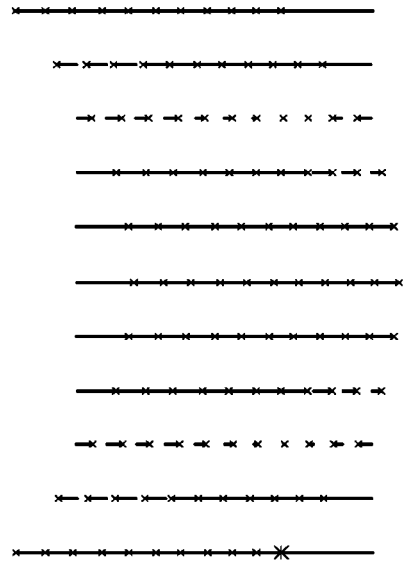
Figure 3C:
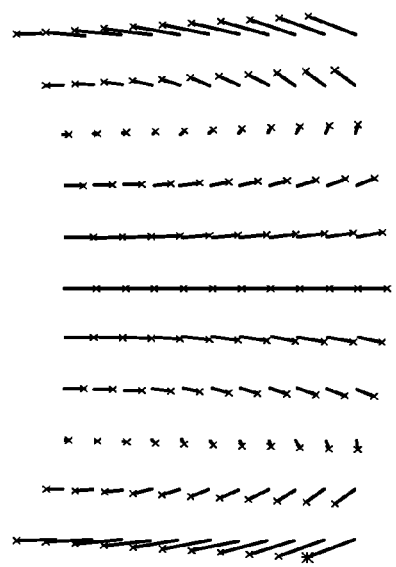
Figure 3D:
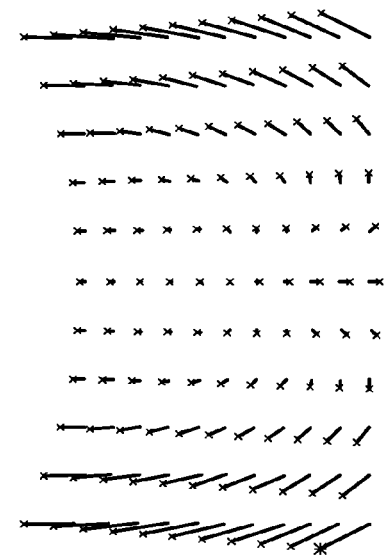
Figure 4A:
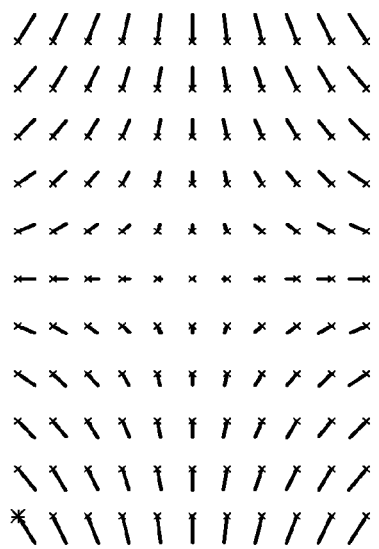
FIGS. 4A-4D schematically depict distortion vector maps of types of distortion from a fitted polynomial, according to one or more embodiments shown and described herein.
Figure 4B:
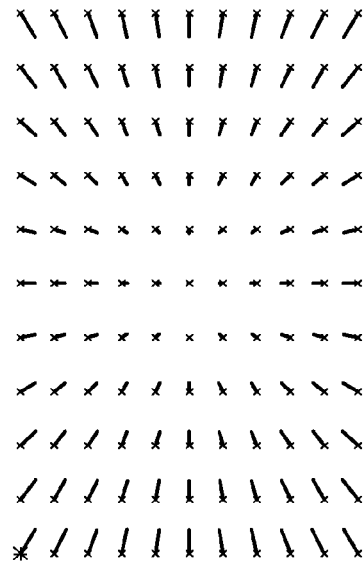
Figure 4C:
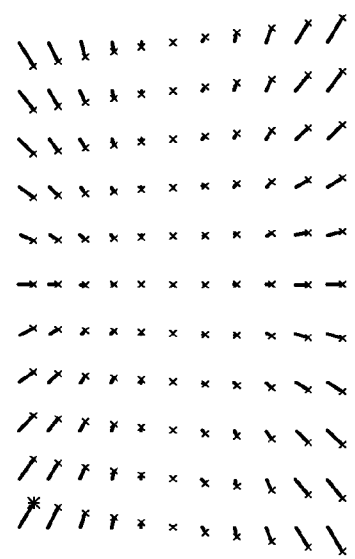
Figure 4D:
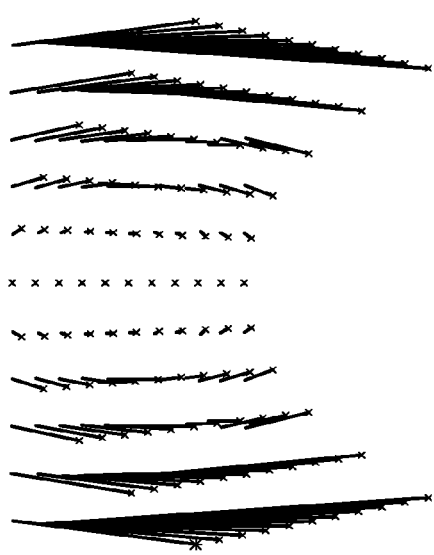

FIGS. 3A-3C illustrate vector maps that depict distortion at each ray in the grid after moving the grid over 2 mm in X (horizontal direction). The angle α to scan the field 2 mm depends on the transform function. In particular, FIG. 3A depicts a distortion vector map for the transform function f*tan(θ). The maximum distortion is 42.220 μm and the average distortion is 13.568 μm in FIG. 3A. FIG. 3B depicts a distortion vector map for the transform function f*(sin(θ)). The maximum distortion is 30.849 μm and the average distortion is 12.648 μm in FIG. 3B. FIG. 3C depicts a distortion vector map for the transform function f*(θ). The maximum distortion is 20.914 μm and the average distortion is 9.652 μm in FIG. 3C. FIG. 3D depicts a distortion vector map for the transform function f*(1.5*θ−0.5*sin(θ)). The maximum distortion is 25.798 μm and the average distortion is 10.397 μm in FIG. 3D.

The vector arrays of FIGS. 3A-3D can be fitted to a non-orthogonal polynomial with the terms listed below with no significant residual left over. A fit to an orthogonal polynomial provides the same coefficient independent of which terms are fitted. For these transform functions, only the last 4 terms in the table are needed to have very low residuals to the fits. The fitting method is a least squares type. FIGS. 4A-4D depict an anamorphic magnification distortion vector plot for AnaMag=5 μm (FIG. 4A), a magnification distortion vector plot for Mag=5 μm (FIG. 4B), an X trapezoid distortion vector plot for XTrap=5 μm (FIG. 4C), and an X tangential distortion vector plot for XTan=5 μm.

TABLE 2

| Name of Fitted Distortion Terms | Equation (coefficient starts with capital letter) | Fitted Coefficient for f tan theta at a 2 mm field shift (um) |
|---|---|---|
| X Translation | Δx = XTrans | 0.00 |
| Magnification | Δx = x * Mag<br>Δy = y * Mag | 7.51 |
| Anamorphic Magnification | Δx = x * AnaMag<br>Δy = −y * AnaMag | 2.51 |
| X Trapezoid | Δx = x² * XTrap<br>Δy = x * y * XTrap | 5.03 |
| X Tangential | Δx = y² * XTan<br>Δy = −x * y * XTan | 0.00 |

Figure 5:
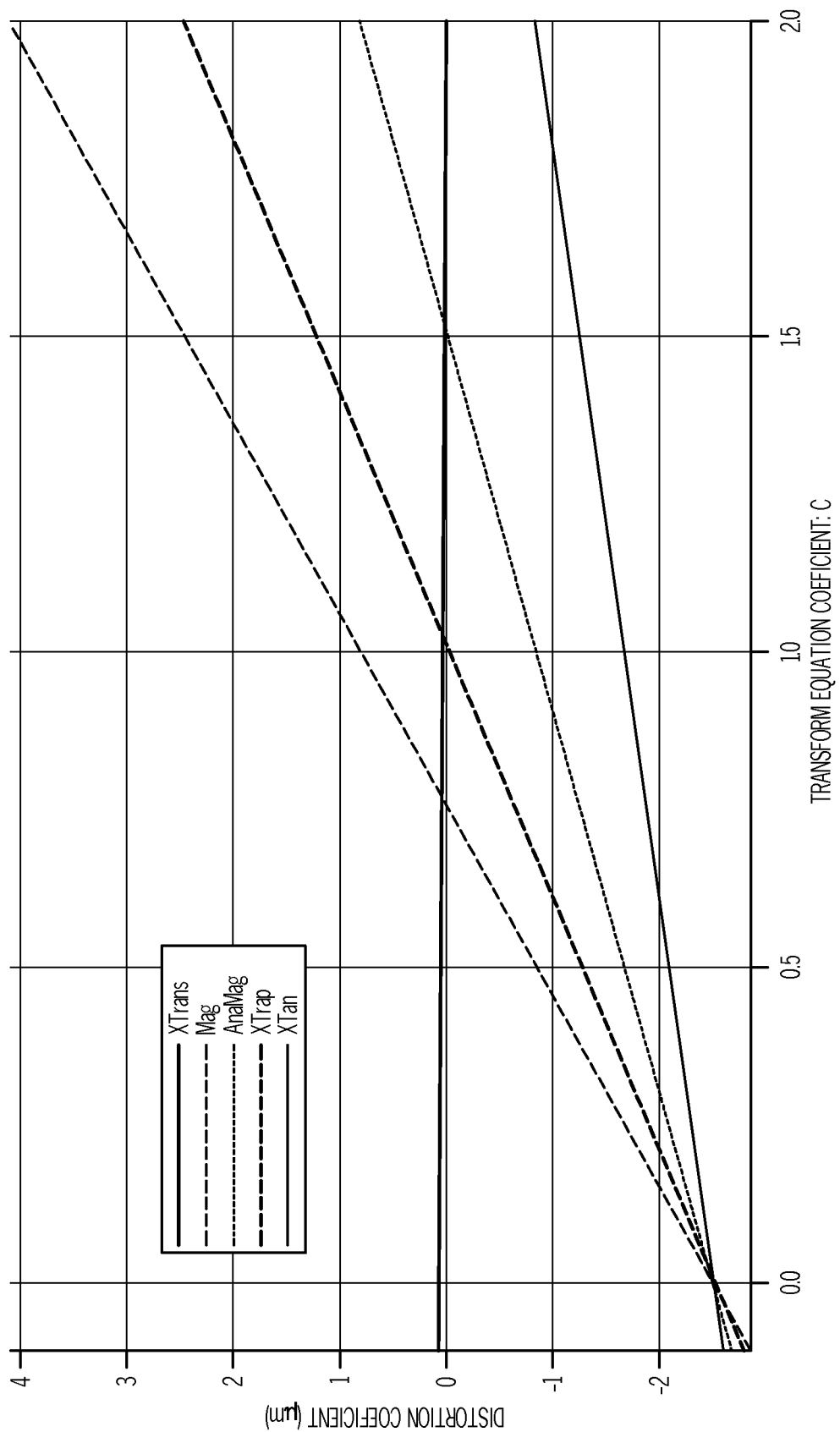
FIG. 5 schematically depicts a plot of distortion coefficients versus the transform equation coefficient c for an $f*(c*\theta+(1-c)*\sin(\theta))$ transform function, according to one or more embodiments shown and described herein.

In the case of the f*(c*θ+(1−c)*sin(θ)) transform function, the fitted distortion coefficients change linearly with the transform function coefficient c as shown in FIG. 5.

There are 4 conditions of the f*(c*θ+(1−c)*sin(θ)) transform function that are of special interest. The first is c=0, f*(0*θ+(1−0)*sin(θ))=f*sin(θ), which can be labeled f sine theta. The f sine theta coefficients that have a Δy component are identical. If these 4 coefficients are set to one and the 4 Δy terms are added together, the result is Δy=y−y+xy−xy=0. The Δy is zero across the field, and that is seen in the vector map for f sine theta (FIG. 3B). This has advantages for some scanning applications. If a single point, such as the focus of a laser beam, is scanned across the field, it would travel straight line independent of the position of the beam in X. Thus if two beams separated in X are scanned in a f sine theta system, then the beams would trace lines that are parallel. In all other transform function systems, a focus beam off in X from the optical axis will curve as scanned. In some applications, such as laser writing on substrates, this could be very advantageous. The Δx distortion could be compensated with the beam(s) being switched on and off at different times, but the Δy distortion might not be correctable, or at least not as efficiently corrected.

The other three special conditions for the f*(c*θ+(1−c)*sin(θ)) transform function occur when one of the fitted distortion terms are zero. The second special condition occurs when c=1, f*(1*θ+(1−1)*sin(θ))=f*θ, which can be labeled f theta. In this case, the trapezoid distortion is zero, and as will be shown has the minimum distortion between scan positions. The third special condition occurs when c=1.5, f*(1.5*θ+(1−1.5)*sin(θ))=f*(3θ−sin(θ))/2. In this case, the anamorphic magnification is zero, and will have minimum distortion at any one scan position. The fourth special condition occurs when c=3, f*(3*θ+(1−3)*sin(θ))= f*(3θ−2 sin(θ)) and the X tangential is zero. This is a very close fit to (θ), which also has X tangential=0. The fit is within 0.1% out to 0.28 radians.

Figure 6:
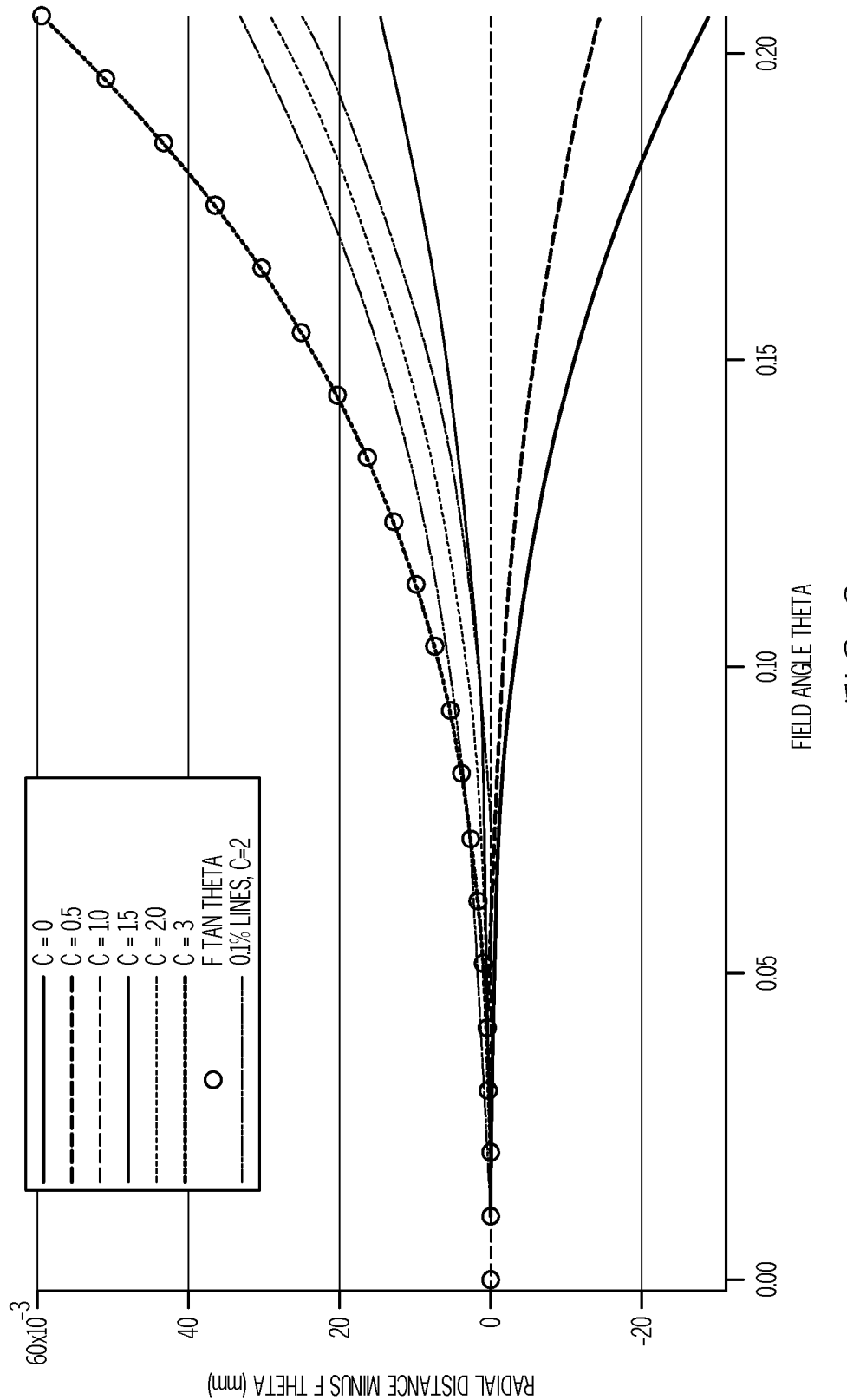
FIG. 6 schematically depicts a plot of a difference between an $f*(c*\theta+(1-c)*\sin(\theta))$ transform function and a transform function $f*\theta$ versus the field angle $\theta$ for various values of c, according to one or more embodiments shown and described herein.

The plot of these transform functions as radial distance versus field angle θ show that they nearly overlap, though that significantly different distortion residuals. A better way to plot the transform functions is to plot the difference of the radial distance output by the f*(c*θ+(1−c)*sin(θ)) transform function from the transform function fθ versus the field angle θ, as shown in FIG. 6. The 0.1% lines around the transform function with a coefficient of 2, shown in FIG. 6, are the lines for 1.001*f*(c*θ+(1−c)*sin(θ)) for c=2 and 0.999*f*(c*θ+(1−c)*sin(θ)) for c=2. A lens design's transform function can be calculated by plotting the radial position of an image point as a function of field angle. If the transform function lies within 0.1% of the f*(c*θ+(1−c)*sin(θ)) transform function, for any constant c, then it would be considered essentially a lens of the transform function of the form f*(c*θ+(1−c)*sin(θ)), where f is the focal length that might or might not be calibrated for best distortion.

Each of the vector plots shown in FIGS. 3A-3D is the calculated (Δx, Δy) from the scan minus a fitted translation term in X. If translation is only fitted, then the fit is the average Δx over the array. This average is subtracted from the calculated Δx value of the vector. The translation is a deviation (<1%) of the intended scan length of 2 mm. In some optical systems, the control of the scan mirror can be designed to remove this deviation in scan and this contribution to the distortion is removed. If a correction is not possible, then fitted translation is included in the distortion. The fitted translation is not significant for the case of the f tan theta transform function, and the correction of the deviation can be avoided. In the case of f theta, the fitted translation is proportional to the scan distance and α. The intended scan translation of fα is scaled −0.54%, or the effective focal length for the scan is 0.54% shorter, but the focal length for the field coverage is not.

TABLE 3

| | max distortion before translation (um) | fitted translation (um) | fitted translation/ 2 mm (%) | max distortion after translation (um) |
|---|---|---|---|---|
| f tan theta | 42.9 | 2.0 | 0.10% | 42.2 |
| f theta + sine theta, c = 0 | 48.0 | −17.2 | −0.86% | 30.8 |

TABLE 3-continued

|  | max distortion before translation (um) | fitted translation (um) | fitted translation/ 2 mm (%) | max distortion after translation (um) |
|---|---|---|---|---|
| f theta + sine theta, c = 1 | 30.0 | −10.7 | −0.54% | 20.9 |
| f theta + sine theta, c = 1.5 | 25.8 | −7.5 | −0.38% | 21.8 |

Magnification, like translation, can be corrected in some optical systems. This is sometimes known as calibrating the focal length to minimize the distortion. Unlike translation, a calibration of the focal length is across the scan, so the magnification is not nominal when the field is centered on the optical axis ($\alpha=0$).

TABLE 4

|  | max distortion before translation (um) | max distortion after translation (um) | fitted magnification change to focal length (%) | max distortion after Xtrans and Mag removed (um) | "distortion" from magnification at $\alpha = 0$ (um) | max shift of a point across the scan from distortion (um) |
|---|---|---|---|---|---|---|
| f tan theta | 42.9 | 42.2 | 0.53% | 21.3 | 21.8 | ~43 |
| f theta + sine theta, c = 0 | 48.0 | 30.8 | −0.03% | 30.6 | 1.2 | ~32 |
| f theta + sine theta, c = 1 | 30.0 | 20.9 | 0.16% | 19.1 | 6.4 | ~26 |
| f theta + sine theta, c = 1.5 | 25.8 | 21.8 | 0.25% | 15.1 | 10.2 | ~25 |

Figure 7A:
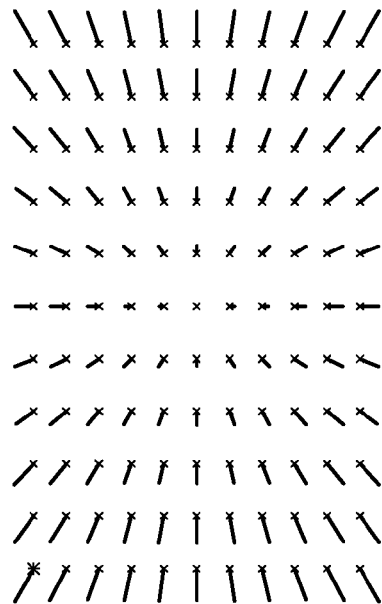
FIGS. 7A-7B depict distortion vector maps for an $f*\tan(\theta)$ transform function at two scan angles, according to one or more embodiments shown and described herein.
Figure 7B:
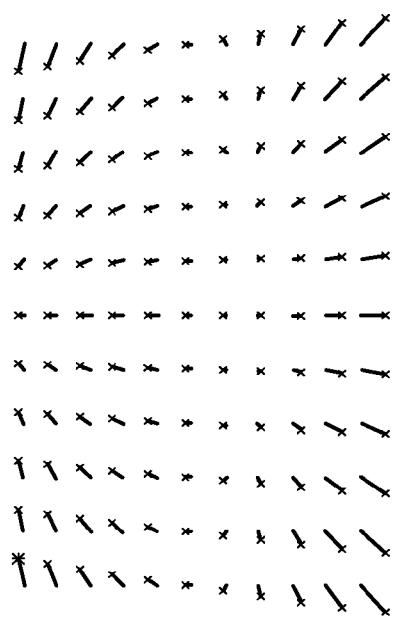
Figure 8:
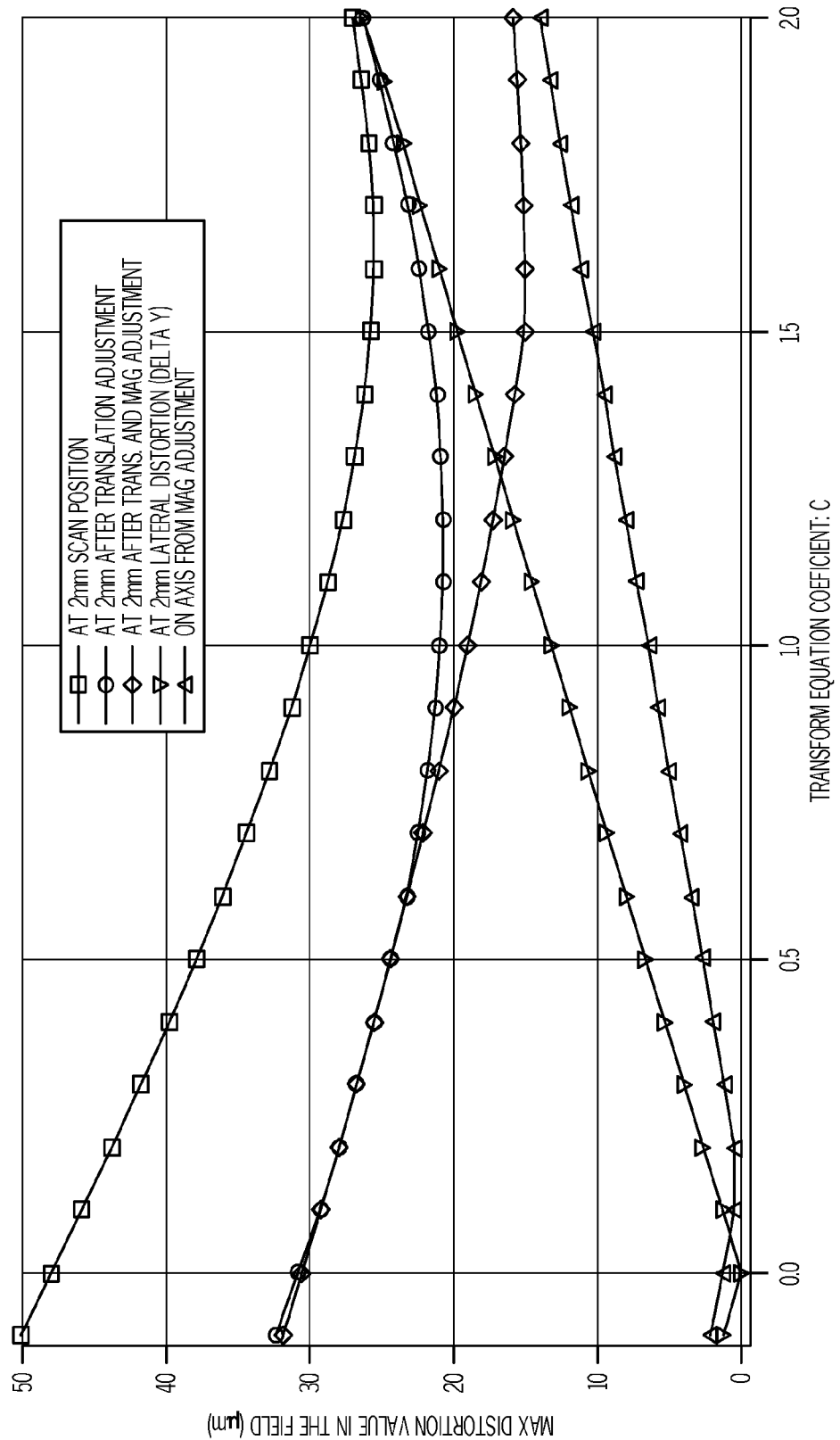
FIG. 8 depicts a plot of maximum distortion values versus transform coefficients for an $f*(c*\theta+(1-c)*\sin(\theta))$ transform function, according to one or more embodiments shown and described herein.

For magnification, the distortion is not improved by removing the fitted magnification for the sine theta transform function, and is only slightly improved for the f theta case. In the case of f tan theta, the max distortion at the scan length of 2 mm ($\alpha \cong 0.1°$) is cut in half. Yet, this mag change effectively adds distortion to the field centered on the optical axis ($\alpha=0$). FIG. 7A depicts a distortion vector map for f tan theta, with $\alpha=0°$ and the focal length calibrated. FIG. 7B depicts a distortion vector map for f tan theta, with $\alpha \cong 0.1°$ and the focal length calibrated. The lower right corner of each of FIGS. 7A-7B have vector lengths of <22 um. This is with the field center on axis (left) and shifted 2 mm (right). Yet from the center to the edge of the scan, the detection point would have shifted ~42 um. The total shift of any point in the array across the scan from the distortion needs to be minimized in many applications. An example is a system that images a moving object and the scanning mirror is used to track it to increase the exposure time of the camera. In these systems, it can be seen from FIG. 8 that c near 1.0 (a system having an $f*(\theta)$ transform function) produce the minimum distortion with only a translation adjustment and not a magnification adjustment. This would be the minimum shift across the scan.

In other optical systems it is the distortion of any instantaneous image during the scan that needs to be minimized In these applications, the f tan theta transform lenses after lateral and magnification adjustment have similar maximum distortion values to the f theta (c~1) lenses. Yet, systems in which c~1.5 or $f*(3\theta-\sin(\theta))/2$ have distortion at roughly ¾ of either the f theta or f tan theta lenses.

Figure 9:
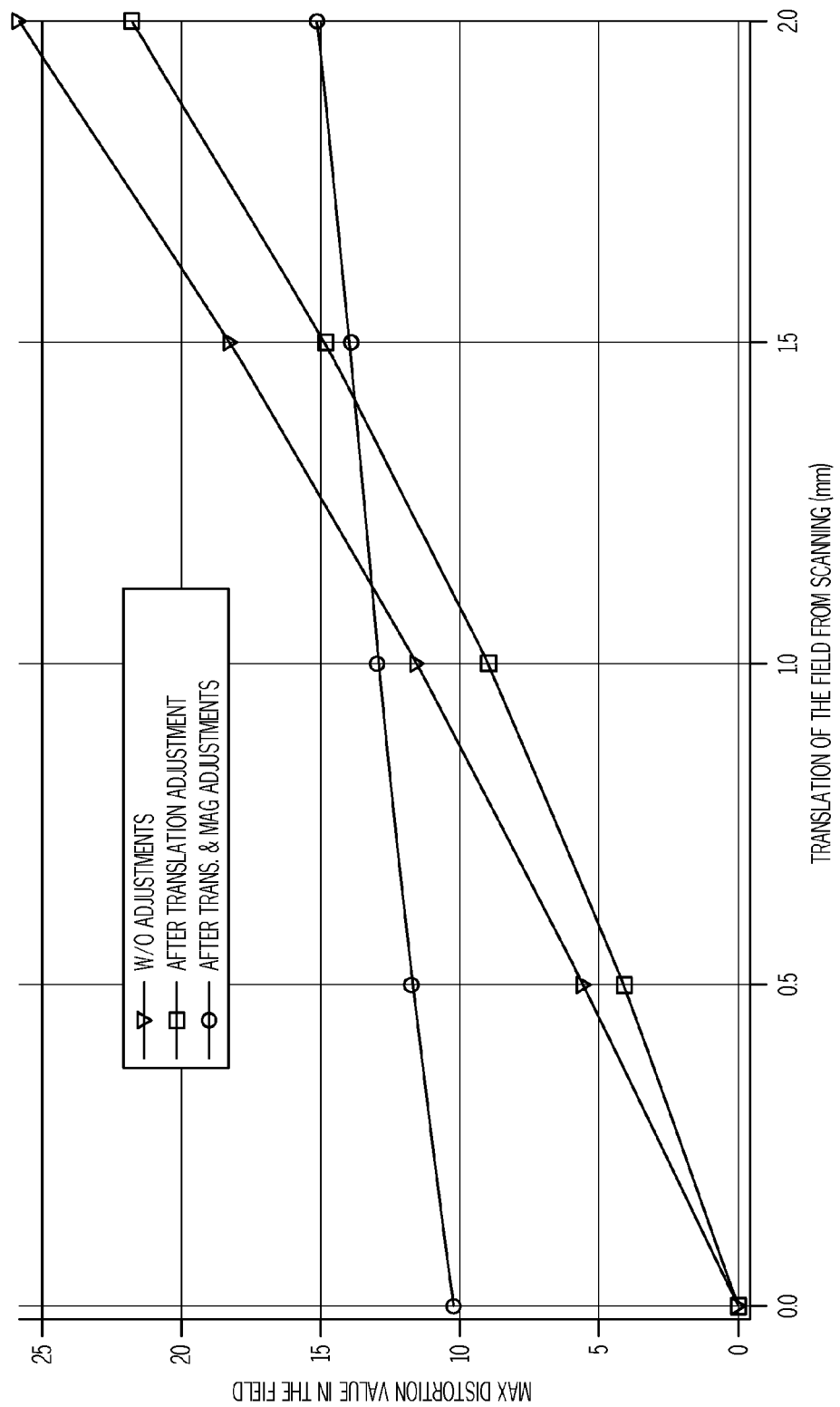
FIG. 9 depicts a plot of maximum distortion values versus translation of the field from scanning, according to one or more embodiments shown and described herein.

FIG. 9 shows how the max distortion for a transform constant c=1.5 in the field over the scan of 2 mm is ~10 um on axis (translation=0) and reaches up to ~15 um at a translation of 2 mm. Yet one point of the field shifts ~22 um from 0 to 2 mm translation of the field.

The optimum value of c for the $f*(c*\theta+(1-c)*\sin(\theta))$ transform function can vary with the field size and aspect relative the focal length. As demonstrated, it also varies upon which form of distortion that a system is most sensitive to. If it is lateral distortion, then c=0 will always provide $\Delta y=0$ and the four fitted distortion terms will be equal. If it is shift of a field point across the scan, then $c \cong 1$ will be optimum where the X trapezoid term is near zero. If it is the instantaneous distortion, then $c \cong 1.5$ is optimum, where the anamorphic magnification term is near zero.

It may be desirable for a second optical system to have a transform function the same as the first optical system to have no distortion in finite imaging when the scanned field is centered on the optical axis.

Explanation of the Distortion Calculations

Figure 10:
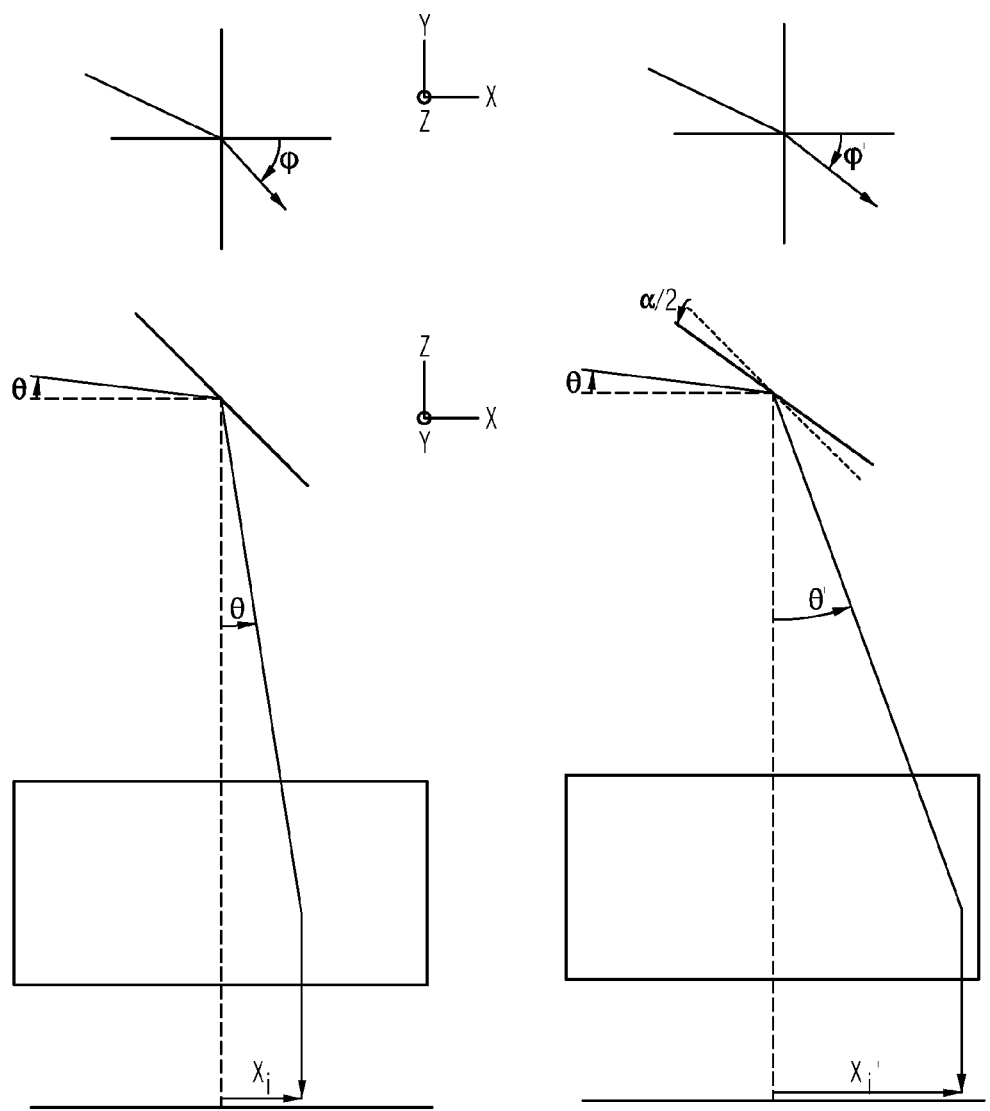
FIG. 10 depicts rays of light incident on a mirror and an image plane at various angles, according to one or more embodiments shown and described herein.

Referring to FIG. 10, due to rotational symmetry of a rotationally symmetric lens, the angle $\phi$ in the spherical coordinate system of the pupil can be defined from the x and y intercept of the ray at the image. Choosing a point on the image plane the spherical coordinates of the ray at the pupil can be calculated. inv_func( ) is the inverse transform function of the transform function.

$$\phi = \tan^{-1} \frac{x_i}{y_i}$$

$$r_i = \sqrt{x_i^2 + y_i^2}$$

$$\theta = \text{inv\_func}\left(\frac{r_i}{f}\right)$$

These are converted to direction cosines. These are the cosine of the angles subtended by ray and the x, y and z axis respectively to l, m and n:

l=sin θ cos φ m=sin θ sin φ n=cos θ

The mirror is tilted at the pupil around the Y axis passing through the center of the pupil by an angle φ/2, such that the rays angle is increased in the XZ plane by α. New direction cosines (prime) of the ray's direction are calculated by the transformation matrix multiplication:

$$\begin{bmatrix} l' \\ m' \\ n' \end{bmatrix} = \begin{bmatrix} \cos\alpha & 0 & \sin\alpha \\ 0 & 1 & 0 \\ -\sin\alpha & 0 & \cos\alpha \end{bmatrix} \begin{bmatrix} l \\ m \\ n \end{bmatrix}$$

The direction in spherical coordinates of the new ray are calculated from the direction cosines:

$$\phi' = \tan^{-1}\frac{l'}{m'}$$
$$\theta' = \cos^{-1} n'$$

The new ray's intercept at the image plane can are calculated as:

$$x_i' = f^* \text{func}(\theta')^* \cos \phi'$$

$$y_i' = f^* \text{func}(\theta')^* \sin \phi'$$

The displacement of the ray from its nominal position (a.k.a distortion) is calculated as:

$$\Delta x = x_i' - x_i - f^* \text{func}(\alpha)$$

$$\Delta y = y_i' - y_i$$

The subscript i is used to denote the focal plane of the infinite corrected objective, which is typically an image plane. In many applications the object is at the focal plane of the objective and a tube lens is used to image that plane to detector.

The term $f^*\text{func}(\alpha)$ in the equation $\Delta x$ is the design or intended shift of the whole image field on the focal plan. The terms $(\Delta x, \Delta y)$ are the unintended displacement, or the distortion of an image point at $(x_i, y_i)$ that has moved to $(x_i', y_i')$ due to the tilt of the mirror.

While $(\Delta x, \Delta y)$ is for a single ray or point on the focal plane, a grid of rays is used to calculate the distortion over the field of use at the focal plane. The grid of rays have been chosen to be evenly spaced for when the field is centered on the optical axis of the lens ($\alpha=0$), and so there is zero distortion for when the field is centered on axis. In a finite imaging case, both infinite corrected lenses have the same transform function in some embodiments.

The distortion $(\Delta x, \Delta y)$ is for a ray passing through the center of the entrance pupil and thus the aperture stop of the objective. In actuality, there will be some secondary distortion effects from asymmetric pupil aberration of the objective, or coma. For a well corrected system, this is a small fraction of the center rays for each field point. A well corrected system, or lens, is one in which the aberration of the imaging is minimized to have high fidelity, or resolution, in the imaging.

While the embodiments described herein include an optical system for imaging a two dimensional field with one two dimensional image sensor, other embodiments may image a two dimensional field with an array of two dimensional image sensors. In embodiments in which the two dimensional field is imaged with an array of two dimensional sensors, separate lens assemblies having distortion mitigating lens designs may be in separate optical paths between each of the array of two dimensional image sensors and the two dimensional field to be imaged.

It should now be understood that optical systems including lens assemblies having distortion mitigating lens designs and methods of imaging fields of view using such optical systems, as described herein, result in lower overall system distortion, reduced trapezoidal distortion, and increased pixel light density when imaging a scanned field of view compared to systems including lens assemblies having conventional lens designs. Such mitigated system distortion is highly desirable in optical systems in which it is desirable to reliably and accurately image a moving field of view or sample.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical system for imaging a two dimensional field comprising:
   a first lens assembly having a first transform function whose output is within 0.1% of $f_1^*(c_1^*\theta_1+(1-c_1)^*\sin(\theta_1))$ for any ray of light that traverses the first lens assembly from a center of an entrance pupil of the first lens assembly at a non-zero angle $\theta_1$ relative to an optical axis of the first lens assembly, wherein $f_1$ is a focal length of the first lens assembly, and wherein $$-0.5 < c_1 < 2;$$

a first scanning mirror;
   a second lens assembly having a second transform function whose output is within 0.1% of $f_2^*(c_2^*\theta_2+(1-c_2)^*\sin(\theta_2))$ for any ray of light that traverses the second lens assembly from a center of an entrance pupil of the second lens assembly at a non-zero angle $\theta_2$ relative to an optical axis of the second lens assembly, wherein $f_2$ is a focal length of the second lens assembly, and wherein $-0.5 < c_2 < 2$; and
   a two dimensional image sensor, wherein:
   the first lens assembly, the first scanning mirror, and the second lens assembly are positioned in an optical path between the two dimensional field and the two dimensional image sensor such that light from the two dimensional field traverses the second lens assembly, is incident on the first scanning mirror, is redirected into the first lens assembly by the first scanning mirror, traverses the first lens assembly, and is incident upon the two dimensional image sensor, thereby imaging the two dimensional field with the two dimensional image sensor.

2. The optical system of claim 1, wherein $c_1=c_2$, such that the first transform function and the second transform function are the same.

3. The optical system of claim 1, wherein $c_1=1$.

4. The optical system of claim 1, wherein $c_1=0$.

5. The optical system of claim 1, wherein $c_1=1.5$.

6. The optical system of claim 1, wherein:
   the first lens assembly has an entrance pupil;
   the second lens assembly has an exit pupil; and
   the first scanning mirror is positioned at the entrance pupil of the first lens assembly and at the exit pupil of the second lens assembly.

7. The optical system of claim 1, further comprising:
a second scanning mirror positioned in the optical path between the two dimensional field and the two dimensional image sensor; and
an image relay positioned in the optical path between the two dimensional field and the two dimensional image sensor, wherein the light from the two dimensional field traverses the second lens assembly, is incident on the second scanning mirror, is redirected into the second lens assembly by the second scanning mirror, traverses the image relay, is incident on the first scanning mirror, is redirected into the first lens assembly by the first scanning mirror, traverses the first lens assembly, and is incident upon the two dimensional image sensor.

8. The optical system of claim 1, wherein the first lens assembly and the second lens assembly are infinite conjugate lens assemblies.

9. The optical system of claim 1, further comprising an illumination source, wherein the illumination source outputs electromagnetic radiation incident on the two dimensional field to illuminate the two dimensional field.

10. The optical system of claim 1, wherein the first lens assembly and the second lens assembly include the same components.

11. A method of imaging a two dimensional field comprising:
providing an optical system, the optical system comprising:
a first lens assembly having a first transform function whose output is within 0.1% of $f_1*(c_1*\theta_1+(1-c_1)*\sin(\theta_1))$ for any ray of light that traverses the first lens assembly from a center of an entrance pupil of the first lens assembly at an angle $\theta_1$ relative to an optical axis of the first lens assembly, wherein $f_1$ is a focal length of the first lens assembly, and wherein $-0.5<c_1<2$;
a first scanning mirror;
a second lens assembly having a second transform function whose output is within 0.1% of $f_2*(c_2*\theta_2+(1-c_2)*\sin(\theta_2))$ for any ray of light that traverses the second lens assembly from a center of an entrance pupil of the second lens assembly at an angle $\theta_2$ relative to an optical axis of the second lens assembly, wherein $f_2$ is a focal length of the second lens assembly, and wherein $-0.5<c_2<2$; and
a two dimensional image sensor, wherein:
the first lens assembly, the first scanning mirror, and the second lens assembly are positioned in an optical path between the two dimensional field and the two dimensional image sensor such that light from the two dimensional field traverses the second lens assembly, is incident on the first scanning mirror, is redirected into the first lens assembly by the first scanning mirror, traverses the first lens assembly, and is incident upon the two dimensional image sensor; and
rotating the first scanning mirror such that light from the two dimensional field traverses the second lens assembly, is incident on the first scanning mirror, is redirected into the first lens assembly by the first scanning mirror, traverses the first lens assembly, and is incident upon the two dimensional image sensor when the two dimensional field moves relative to the optical system, such that the two dimensional field remains imaged by the two dimensional image sensor.

12. The method of claim 11, wherein $c_1=c_2$, such that the first transform function and the second transform function are the same.

13. The method of claim 11, wherein $c_1=1$.

14. The method of claim 11, wherein $c_1=0$.

15. The method of claim 11, wherein $c_1=1.5$.

16. The method of claim 11, further comprising outputting electromagnetic radiation from an illumination source onto the two dimensional field.

17. The method of claim 11, wherein:
the first lens assembly has an entrance pupil;
the second lens assembly has an exit pupil; and
the first scanning mirror is positioned at the entrance pupil of the first lens assembly and at the exit pupil of the second lens assembly.

18. The method of claim 11, wherein the first lens assembly and the second lens assembly are infinite conjugate lens assemblies.

19. An optical system for imaging a two dimensional field comprising:
a first lens assembly having a first transform function whose output is within 1% of $f_1*(c_1*\theta_1+(1-c_1)*\sin(\theta_1))$ for any ray of light that traverses the first lens assembly from a center of an entrance pupil of the first lens assembly at a non-zero angle $\theta_1$ relative to an optical axis of the first lens assembly, wherein $f_1$ is a focal length of the first lens assembly, and wherein
$-0.5<c_1<2$;
a first scanning mirror;
a second lens assembly having a second transform function whose output is within 1% of $f_2*(c_2*\theta_2+(1-c_2)*\sin(\theta_2))$ for any ray of light that traverses the second lens assembly from a center of an entrance pupil of the second lens assembly at a non-zero angle $\theta_2$ relative to an optical axis of the second lens assembly, wherein $f_2$ is a focal length of the second lens assembly, and wherein $-0.5<c_2<2$; and
a two dimensional image sensor, wherein:
the first lens assembly, the first scanning mirror, and the second lens assembly are positioned in an optical path between the two dimensional field and the two dimensional image sensor such that light from the two dimensional field traverses the second lens assembly, is incident on the first scanning mirror, is redirected into the first lens assembly by the first scanning mirror, traverses the first lens assembly, and is incident upon the two dimensional image sensor, thereby imaging the two dimensional field with the two dimensional image sensor.

20. An optical system of claim 19, wherein the first lens assembly has the first transform function whose output is within 0.5% of $f_1*(c_1*\theta_1+(1-c_1)*\sin(\theta_1))$ for any ray of light that traverses the first lens assembly from a center of an entrance pupil of the first lens assembly at the angle $\theta_1$; and
the second lens assembly has the second transform function whose output is within 0.5% of $f_2*(c_2*\theta_2+(1-c_2)*\sin(\theta_2))$ for any ray of light that traverses the second lens assembly from a center of an entrance pupil of the second lens assembly at the angle $\theta_2$.

21. The optical system of claim 19, further comprising:
a second scanning mirror positioned in the optical path between the two dimensional field and the two dimensional image sensor; and
an image relay positioned in the optical path between the two dimensional field and the two dimensional image sensor, wherein the light from the two dimensional field traverses the second lens assembly, is incident on the second scanning mirror, is redirected into the second lens assembly by the second scanning mirror, traverses the image relay, is incident on the first scanning mirror, is redirected into the first lens assembly by the first scanning mirror, traverses the first lens assembly, and is incident upon the two dimensional image sensor.

\* \* \* \* \*